United States Patent [19]

Eccardt et al.

[11] Patent Number: 4,616,541

[45] Date of Patent: Oct. 14, 1986

[54] WALKING BEAM SCROLL SAW

[75] Inventors: Curtis J. Eccardt, St. Charles County; Richard B. Brundage, St. Louis County, both of Mo.

[73] Assignee: Emerson Electric Co., St. Louis, Mo.

[21] Appl. No.: 640,399

[22] Filed: Aug. 13, 1984

[51] Int. Cl.[4] .................................. B23D 49/00
[52] U.S. Cl. .................................. 83/98; 83/546; 83/662; 83/782
[58] Field of Search ............... 83/98, 545, 546, 746, 83/768–786, 662; 417/489; 92/89

[56] References Cited

U.S. PATENT DOCUMENTS

| 76,730 | 8/1868 | Demming | 83/781 X |
|---|---|---|---|
| 83,362 | 10/1868 | Chamberlin | 83/781 X |
| 126,740 | 5/1872 | Powers | 83/98 |
| 2,240,307 | 4/1941 | List | 417/489 X |
| 3,104,688 | 9/1963 | Bretthauer | 83/814 |
| 3,213,909 | 10/1965 | Kivimaa | 83/777 |
| 3,878,876 | 4/1975 | Abel | 145/32 R |
| 4,204,444 | 5/1980 | Kohr | 83/814 X |

FOREIGN PATENT DOCUMENTS 1206523 4/1959 France ............... 83/777
22960 of 1897 United Kingdom ........ 83/777

OTHER PUBLICATIONS

Hegner Owner's Manual–"Multicut 2".
Dremel Owner's Manual–"Moto-Shop".
Sears Owners Manual-Craftsman 18-inch Jig Saw.
Mark White—"Building a Walking-Beam Saw".
Frank B. Henry—"Shop Made Scroll Saw Does Precision Work"—Workbench Magazine—Jul.-Aug., 1981.

Primary Examiner—James M. Meister
Attorney, Agent, or Firm—Polster, Polster and Lucchesi

[57] ABSTRACT

A scroll or jigsaw of the walking beam type is disclosed in which the upper and lower beams or arms are of hollow, tubular construction so as to have sufficient rigidity to resist up and down vibrational movement, and so as to permit lateral cutting. The beams are mounted in a pair of identical die cast frame members, and the drive motor is mounted directly to the rear of the frame members. The motor is connected to the rear ends of the beams for reciprocably driving them. The frame members, together with the motor, are pivotally mounted relative to a base or table frame thereby to permit angling of the saw blade (as opposed to tilting the table) for bevel cuts.

9 Claims, 11 Drawing Figures

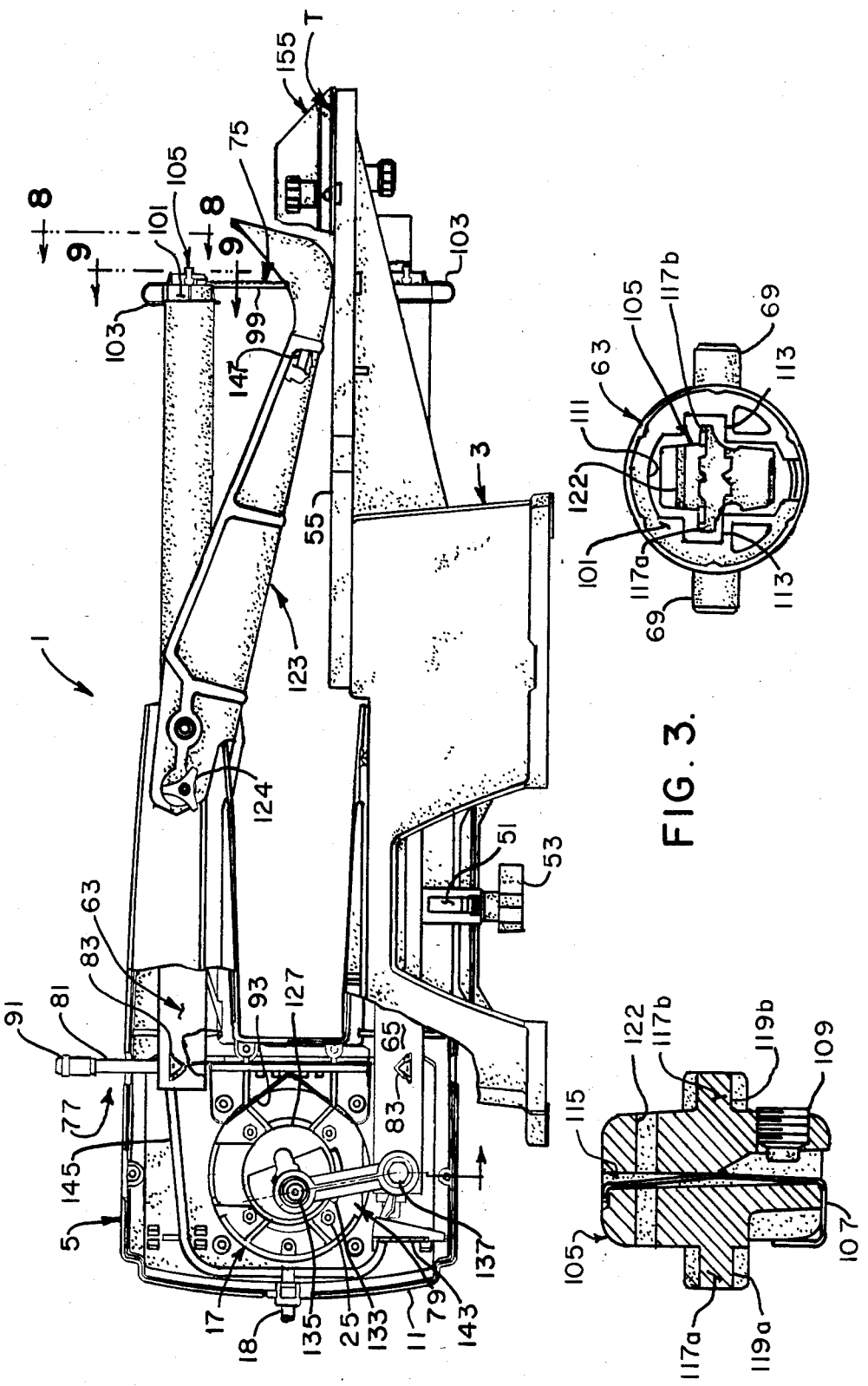

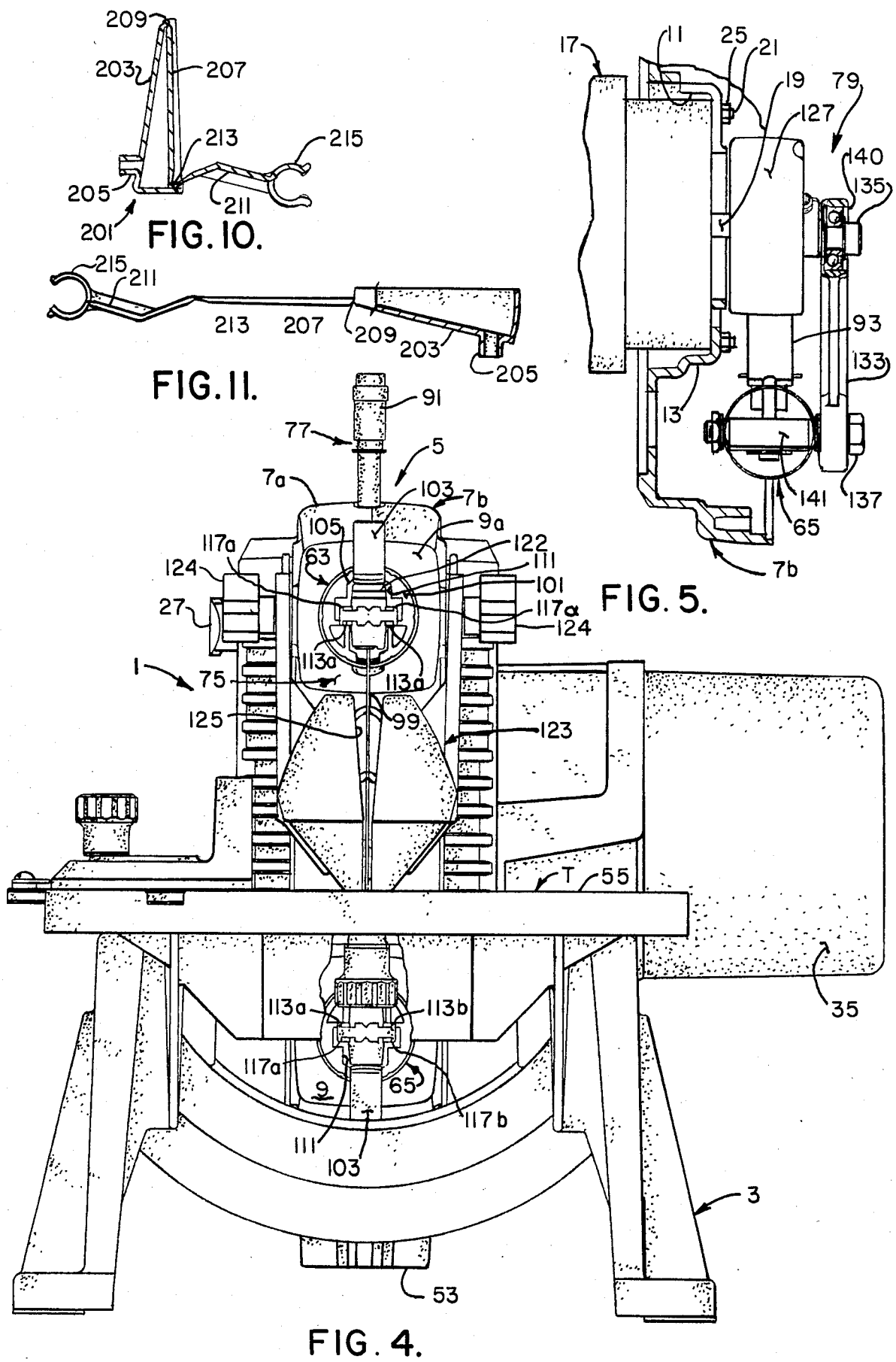

WALKING BEAM SCROLL SAW

BACKGROUND OF THE INVENTION

This invention relates to a walking beam scroll saw or jigsaw.

Generally, a walking beam scroll saw or jigsaw utilizes two parallel arms or beams and a relatively thin under blade tension between the outer ends of the beams. The beams are pivotally mounted on trunnions or bearings, and means are employed at the ends of the beams opposite the blade so as to maintain the blade under tension. A motor or other drive means is connected to one of the beams (conventionally at the end thereof toward the blade) so as to reciprocate the beams in an up and down fashion such that the saw blade reciprocates relative to the workpiece for cutting purposes. Walking beam saws generally have the same uses for cutting wood, metal, plastic, and other materials, as a band saw, but the walking beam saw blades may be replaced in a relatively short time and at low expense, as compared to a band saw. Also, like a band saw, walking beam saws may be used to cut curvilinear lines and rather intricate patterns and shapes.

As is typical in most reciprocal saws, the teeth on the saw blade are angled such that the saw blade cuts primarily on the downstroke. Such walking beam saws are well known.

Reference may be made to U.S. Pat. No. 3,878,876 in which a suspension arrangement for a walking beam saw is disclosed. In this '876 patent, the saw blade is floatingly supported in a frame utilizing forked clamping elements which are clamped to the ends of the saw blade. The forked elements holding the blade fit into a depression fulcrum arrangement on the end of the arm so that the blade can rock or tilt.

Heretofore, bevel or angle cuts made with a walking beam saw were achieved by angling the work supporting table relative to the vertical plane of the reciprocating blade. However, with the work mounted at an angle, it was sometimes difficult for the saw operator to hold the wood against slipping on the angled table to achieve accurate cutting results.

Also, other prior scroll saws or jigsaws were known in which a reciprocating blade was maintained under tension and reciprocated up and down by means of a crank drive or the like. Typically, these prior art jigsaws utilized a spring loaded mechanism for returning the blade from its lowered position to its raised position for being forcefully drawn down by the drive mechanism during its cutting stroke. However, when cutting certain types of material which may frictionally grip the sides of the blade, since the blade was not forcefully drawn to its raised position, compression loads with consequent bending could be applied to the blade causing blade breakage or bending if the spring return could not move the blade to its raised position.

In certain prior art walking beam scroll or jigsaws, the beams were made of elongate plate-like members on edge relative to their pivot axis so as to have substantial rigidity in vertical direction. However, because the beams of these walking beam scroll saws were relatively thin in lateral direction, such scroll saws may not have the capability of having high lateral loads applied thereto, such as may be experienced in cutting tight radii in an intricate scroll workpiece, or in making long, lateral rip cuts. To overcome this, frictional bearing plates were often provided to prevent lateral displacement of the beams, but these friction plates reduced cutting efficiency. Moreover, such walking beam saws, even with the lateral friction plates, were not completely satisfactory when ripping relatively long workpieces with the blade positioned laterally with respect to the reciprocating movement of the walking beams.

In other prior art walking beam saws, the beams were made of complex castings so as to be rigid in both vertical and lateral directions. However, these cast beams incorporated a substantial mass which, in turn, increased vibration during operation or required a reduction in operating speed.

SUMMARY OF THE INVENTION

Among the several objects and features of the present invention may be noted the provision of a walking beam scroll saw in which the upper and lower beams are of lightweight construction, so as to minimize vibration, and yet have substantial rigidity in both vertical and lateral direction such that even long lateral rip cuts can be reliably and accurately made;

The provision of such a walking beam scroll saw in which the drive mechanism is connected to the lower beam at the rear thereof, thus permitting the drive motor to be directly mounted to the frame pivotally supporting the upper and lower beams;

The provision of such a walking beam scroll saw in which the frame for pivotally supporting the walking beams is comprised of two identical die cast housings, thus resulting in manufacturing economy and providing substantial rigidity in both vertical and lateral bending, these die cast housings permitting the drive motor to be directly mounted on the die cast housings;

The provision of such a walking beam scroll saw in which the above-mentioned die cast frame housings with the walking beams pivotally mounted therein and with the drive motor directly mounted thereon may be moved as a unit about a horizontal axis relative to the work table or base of the saw such that the work supporting table remains horizontal, and the cutting plane of the blade may be selectively angled relative to the horizontal table for bevel cutting;

The provision of such a walking beam scroll saw which has a relatively long stroke for efficient cutting of thicker workpieces, for effecting self-cleaning of the blade, and for increasing blade service life;

The provision of such a direct drive scroll saw in which the motor is mounted distal from the saw blade so as to minimize ingestion of sawdust into the motor;

The provision of such a walking beam scroll saw which utilizes blade holders adapted to accept either pin end or plain end saw blades of varying widths;

The provision of such a walking beam scroll saw in which the cutting surface of the blade may be turned at right angles relative to the vertical reciprocating plane of the saw blade so as to readily permit long lateral cuts, such as rip cuts;

The provision of such a walking beam scroll saw which has a relatively deep throat (e.g., 18 inches) so as to permit large workpieces to be accommodated by the saw; and The provision of such a walking beam scroll saw which is of rugged construction, which has a long service life, which is relatively inexpensive to manufacture, which has reduced vibration and thus reduces noise, and which is reliable in operation.

Other objects and features of this invention will be in part apparent and in part pointed out hereinafter.

Briefly stated, a walking beam scroll saw of the present invention has a base, a frame carried by the base with the frame having a generally vertically extending rear portion, a top frame portion cantilevered forwardly from the rear portion, and a bottom frame portion cantilevered forwardly from the rear portion. These top and bottom frame portions are spaced vertically from one another. An induction electric motor is secured directly to the rear frame portion. The motor has a drive shaft extending inwardly of the frame. The saw further includes an upper beam pivotally mounted with respect to the upper frame portion intermediate the ends of the upper beam, and a lower beam pivotally mounted with respect to the lower frame portion intermediate its ends. An eccentric linkage means interconnects the motor shaft and one of the beams for reciprocably, pivotally moving this one beam in an up and down fashion with respect to the frame. A blade extends between the outer ends of the upper and lower beams, and means is interposed between the upper and lower beams for placing the blade under tension. Each of these beams is hollow and is of circular cross section so as to minimize the mass of each of the beams, and yet so as to maximize the stiffness of the beams in both vertical and lateral directions.

BRIEF DESCRIPTION OF THE DRAWINGS

FIG. 3 is a right side elevational view of the scroll saw, as it is shown in FIG. 1, with parts broken away so as to more clearly illustrate the manner in which the walking beams are driven by the motor;

FIG. 4 is front elevational view of the scroll saw on a somewhat enlarged scale;

FIG. 5 is a cross sectional view, taken along line 5—5 of FIG. 3, illustrating the drive mechanism for the saw;

FIG. 8 (sheet 3) is a view, taken along line 8—8 of FIG. 3, on an enlarged scale, showing a cap fitted into the end of the tubular beam on which the blade holder shown in FIG. 6 is pivotally mounted with the saw blade held in tension between the outer ends of the upper and lower beams; and FIG. 9 is a vertical cross sectional view of the blade holder on a substantially larger scale than shown in FIG. 6, showing a blade clip inserted in a blade receiving slot within the blade holder for accomodating blades of various widths.

FIG. 10 is a vertical cross sectional view of a bellows-type air pump of the present invention, utilized to blow sawdust or other debris from the workpiece proximate the saw blade; and FIG. 11 is a partial cross section of a one-piece molding which, when folded on itself, constitutes the air pump of FIG. 10.

Corresponding references characters indicate corresponding parts throughout the several views of the drawings.

DESCRIPTION OF A PREFERRED EMBODIMENT

Figures 1, 6, 7:
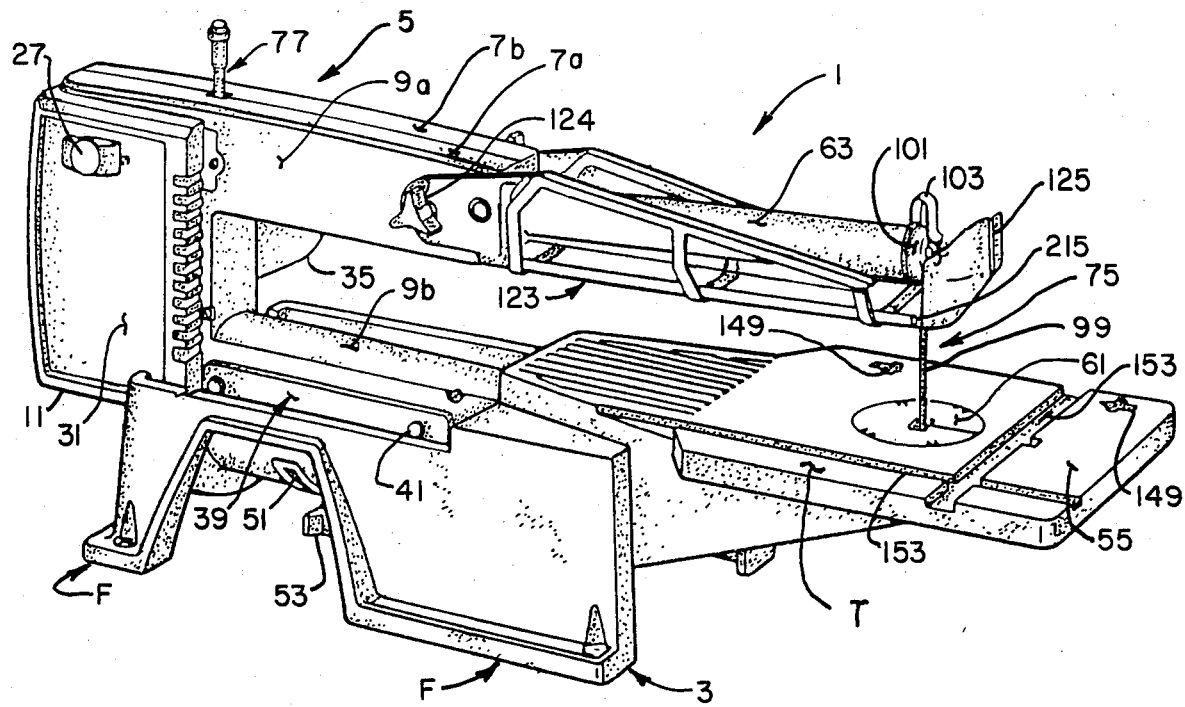
FIG. 1 is a perspective view of a walking beam scroll saw of the present invention.
FIG. 6 (sheet 1) is an enlarged perspective view of a saw blade and universal saw blade holder, permitting the use of either plain end or pin end blades.
FIG. 7 is a perspective view of a portion of the work supporting table of the saw, the table having recesses therein for receiving the blade holder shown in FIG. 6, and for permitting a plain end saw blade to be positioned therein and to be secured relative to the blade holders such that the distance between the blade holders is accurately maintained for ease of installation of the blade holders in the saw.

Referring now to the drawings, a motorized scroll saw of the walking beam type of the present invention is indicated in its entirety by reference character 1. The scroll saw is shown to comprise a base or table frame of integral die cast construction, as generally indicated at 3, having support feet F and at table T integrally die cast therewith. In a manner as will hereinafter appear, a die cast saw frame assembly, as generally indicated at 5, is pivotally mounted with respect to base or table frame 3 so as to permit pivotal movement of the saw frame 5 relative to the table for permitting bevel cutting of a workpiece supported on the table, with the table and the workpiece remaining in horizontal position. More specifically, saw frame 5 includes two identical die cast, machined frame members, as indicated at 7a, 7b, inverted relative to one another and turned back-to-back. By utilizing identical die cast frame members 7a, 7b, an extremely rigid saw frame is realized, and significant cost savings are achieved.

Each of the die cast frame members 7a, 7b includes an upper and a lower frame arm 9a, 9b, respectively, extending generally parallel to one another, and being spaced apart in vertical direction from one another. These frame arms 9a, 9b extend horizontally outwardly from a frame base or back portion 11. This back portion includes a motor recess 13 and a switch opening 15. An induction electric motor (preferably a shaded pole motor), as generally indicated at 17, is received within and is securely mounted to motor recess 13 in the rear of one of the frame members (i.e., in frame member 7b). Electrical power for induction motor 17 is supplied via a power cord 18. The motor has a motor shaft 19 extending inwardly of the saw frame, and the motor is secured to the frame member 7b by means of the bolts or studs 21 received in respective openings 23 in the motor recess 13, with the ends of the bolts 21 having nuts 25 threaded thereon so as to positively secure the motor relative to the saw frame. An on/off switch 27 is mounted in switch opening 15 on frame member 7a to control energization and de-energization of motor 17. The on/off switch 27 is secured relative to frame member 7a by means of screws 29. A cover plate 31 overlies motor recess 13 in frame member 7a, since the motor recess in this frame member is not utilized.

A cooling fan 33 is mounted on the end of motor shaft 19 extending out the rear or outer end of motor 17, and the motor and the cooling fan are enclosed within a motor housing 35 which is secured to frame member 7b. The motor housing includes vent openings 37 through which cooling air is drawn by cooling fan 33 and circulated over motor 17.

Figure 2:
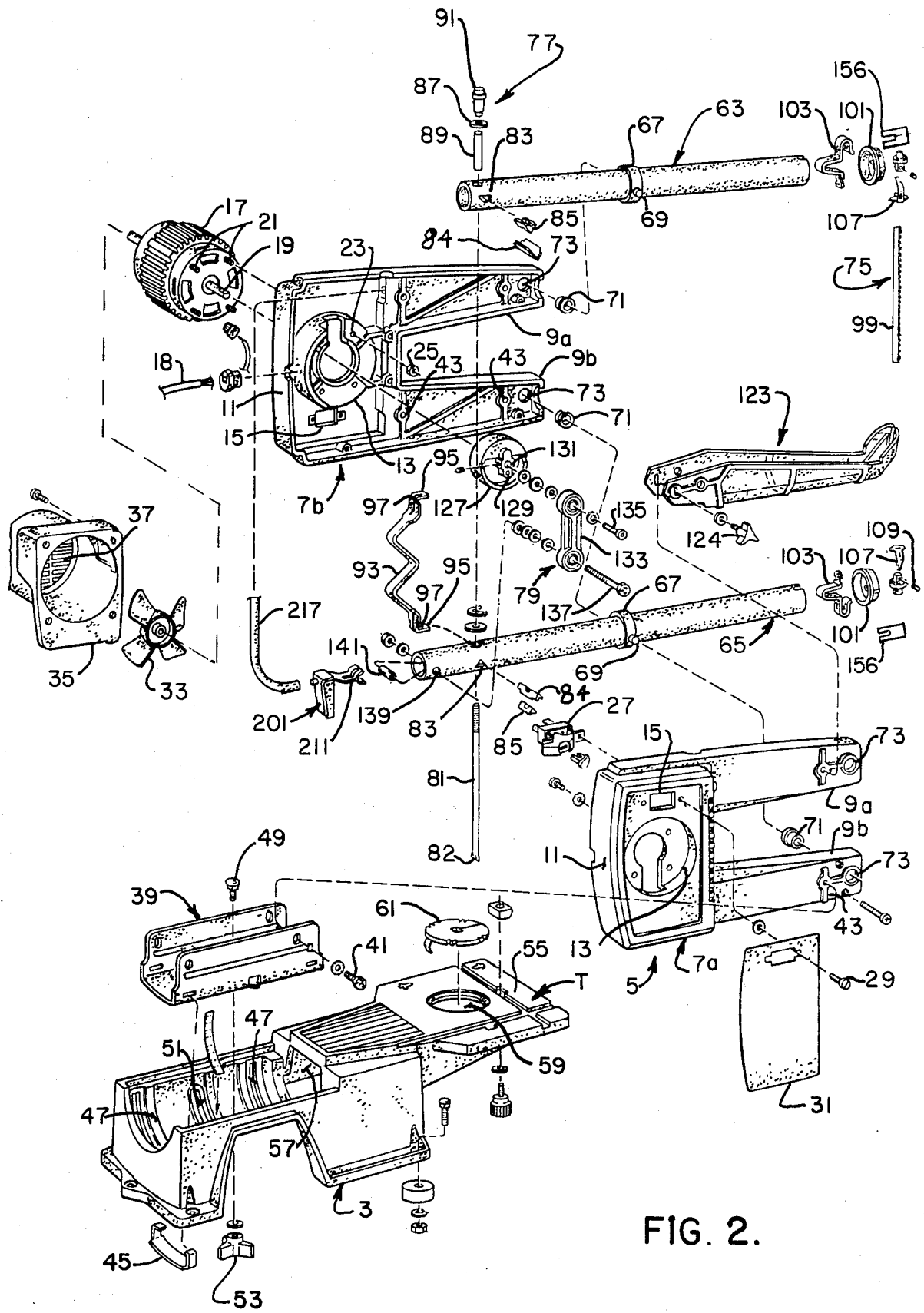
FIG. 2 is an exploded perspective view of the scroll saw, illustrating the major components thereof.

As best shown in FIG. 2, a so-called trunnion bracket, as generally indicated at 39, is secured to frame members 7a, 7b by means of bolts 41 received in holes 43 in lower frame arms 9b. Trunion clips 45 are received in slots at the front and rear of trunnion bracket 39 (the front clip not being shown in FIG. 2). These trunnion clips 45 slide in arcuate tracks 47 die cast-in-place in base 3. A clamping bolt 49 extends downwardly through the bottom or base of trunnion bracket 39, and is received in a arcuate slot 51 intermediate arcuate tracks 47 in base 3, and a clamping knob 53 is threaded onto the end of clamping bolt 49 extending downwardly through slot 51, with the clamping knob being on the outside of base 3, as best shown in FIGS. 3 and 4. In this manner, it will be seen that with frame members 7a, 7b securely mounted in back-to-back relation so as to form the die cast saw frame 5, with motor 17 mounted to the rear portion of the saw frame, and with the walking beam arrangement (as will be hereinafter described in detail) carried by saw frame 5, the saw frame can be pivotally moved about a horizontal, longitudinal axis with respect to base 3 for permitting bevel cuts in a workpiece supported on table T of base 3.

More specifically, base 3 has a work-supporting surface 55 on table T and an opening 57 in front of arcuate slots 47 for receiving the lower arm 9b of saw frame 5, with the lower frame arm below the level of table T. An opening 59 is provided in table surface 55, and a removable insert 61 is provided for the opening, the insert having a relatively small central opening for receiving the saw blade and for supporting the work around the saw blade. Of course, when insert 61 is removed, ready access to the outer end of the lower arm 9b is afforded, so as to facilitate changing blades in a manner as will hereinafter appear.

As heretofore mentioned, scroll saw 1 of the present invention is of the walking beam type, having an upper beam, as generally indicated at 63, and a lower beam, as generally indicated at 65. In accordance with this invention, upper beam 63 and lower beam 65 are of hollow, tubular lightweight construction so as to have substantial rigidity in both vertical and lateral direction, and yet as to have a relatively low mass so as to minimize the energy required to reciprocably drive the saw blade in vertical direction, and so as to reduce vibration. For example, for a scroll saw 1 of the present invention having an 18-inch deep throat, being reciprocably driven by motor 17 at a speed of approximately 1,725 strokes per minute, the upper and lower arms may preferably be of a relatively thin wall tubing, such as 1¼-inch (31.8 mm.) outside diameter aluminum tubing having a wall thickness of about 0.035 inch (0.9 mm.), with the tubing being of a relatively high strength aluminum alloy, such as 6061-T6. This tubing has a weight of about 0.157 lbs./ft. Further, the upper beam may have a length of about 19.3 inches (49.1 cm.), and the lower beam may have a length of about 20.8 inches (59.9 cm.).

Each of the upper and lower beams 63 and 65 has a respective trunnion ring, as indicated at 67, securely mounted thereto intermediate the ends of the beam. Trunion ring 67 has a pair of trunnions 69 extending outwardly on opposite sides thereof. Each trunnion 69 is received in a trunnion bearing 71, which in turn is socketed in a bearing opening 73 provided in a respective frame arms 9a or 9b of frame members 7a, 7b for pivotally mounting the upper and lower arms 63 and 65 for reciprocable movement about a horizontal transverse axis (i.e., the axis of trunnions 69).

As is conventional, the upper and lower beams 63 and 65 are linked together in such manner as to form a parallelogram linkage pivoted on trunnions 69. A blade assembly, as generally indicated at 75, links the front or outer ends of the upper and lower beams together, and an adjustable tension linkage 77 joins the rear end of the arms together. Further, an eccentric crank drive assembly, as generally indicated at 79, interconnects motor shaft 19 and the rear end of lower beam 65 for reciprocably, forceably moving lower beam 65 in up and down direction on its trunnions 69. The tension blade assembly 75 and the adjustable linkage assembly 77 at the front and rear ends of the upper and lower arms cause the upper arm to reciprocate with the lower arm when the lower arm is forceably driven by motor 17.

More specifically, adjustable linkage assembly 77 is shown to comprise a tension rod 81 inserted upwardly through appropriate openings in the rear end of lower beam 65, and through similar openings in the rear end of upper beam 63. The lower end of tension rod 81 is enlarged (i.e., flattened), as indicated at 82. Each of the beams 63 and 65 has a V-shaped opening 83 in the rear end portion thereof which receives V-shaped channel supports 84 which in turn receive V-shaped wedges 85. In turn, these wedges 85 receive tension rod and transmit forces from the tension rod to the upper and lower beams. The enlarged lower end 82 of rod 81 bears against the lower wedge 85 and thus transmits force to the lower beam. The upper end of rod 81 is threaded, and it receives a thrust washer 87 and a bushing 89 with a threaded knob 91 being received thereon, such that the rear ends of the upper and lower arms may be drawn toward one another by tightening threaded knob 91 thereby to decrease the spacing between the V-shaped wedges 85 carried by each of the beams.

Adjustable linkage assembly 77 further comprises a Z-shaped compression spring 93 interposed between the inner faces of the upper and lower beams 63 and 65 thereby to resiliently bias the rear end of the beams away from one another so as to facilitate blade installation, and so as to maintain the beams in engagement with tension rod 81. More specifically, spring 93 has horizontal flattened ends 95 with respective openings 97 therethrough for receiving tension rod 81 through the openings 97. In this manner, the spring is positively retained in its desired compression position between the rear ends of the upper and lower beams.

Tension blade assembly 79 includes a reciprocating saw blade 99 of either the plain end variety (as shown in FIG. 2) or the pin end variety (not shown). Each of the upper and lower beams 63 and 65 has a circular cap 101 fitted in the open, hollow end thereof, with each of the caps receiving a spring biased retainer 103 for purposes as will appear hereinafter. In a manner as will appear in greater detail hereinafter, a blade holder, as generally indicated at 105, is pivotally, rockably supported on its respective blade holder 105 so as to permit blade 99 to be placed under tension, and so as to ensure that the blade is held in proper alignment with respect to the upper and lower beams as the beams are reciprocated by motor 17 and by eccentric drive assembly 79.

As shown in FIGS. 6 and 9, each of the blade holders 105 is an integral die cast member, having a respective blade clip 107 of resilient spring material associated therewith so as to accommodate saw blades 99 of varying widths. Further, clip 107 has a V-shaped blade receiving aperture 108 (see FIG. 6) for accepting blades 99 of varying widths and for centering the blades relative to the clip and to the blade holder 105. A set screw 109 is threaded into a respective opening in the blade holder so as to positively engage and lock the end of the saw blade relative to the blade holder.

As best shown in FIG. 8, cap 101 has an opening 111 therein for receiving blade holder 105. More specifically, cap 101 has a pair of generally inwardly extending, horizontal shoulders 113a, 113b on opposite sides of opening 111 functioning as a fulcrum point for rockably or pivotally supporting a respective blade holder 105 within opening 111. In this manner, with blade holder 105 installed within opening 111, with the blade holder pivotally supported on shoulders 113a, 113b, and with saw blade 99 under tension, the saw blade will be pivotally supported relative to the ends of the upper and lower beams 63 and 65 as the beams are reciprocably driven by motor 17, without applying any bending forces on the blade due to the manner in which it is mounted on the ends of the walking beams 63 and 65.

Referring now to FIG. 9, it will be seen that blade holder 105 has a blade receiving slot 115 extending longitudinally therethrough. Additionally, blade holder 105 has a pair of outwardly extending mounting or pivot arms 117a, 117b on opposite sides thereof, and each of these arms has a respective groove 119a, 119b in the lower and upper faces thereof for receiving shoulders 113a, 113b of cap 101 thereby to rockably or pivotally support the blade guide on fulcrum shoulders 113a, 113b. Spring clip 107 is made of resilient spring steel or the like, and is adapted to have a plain end saw blade 99 inserted between one wall of slot 115 and the portion of the spring clip received within the wall thereby to take up any slack in the slot, such as may be due to saw blades 99 of varying widths and thickness. Of course, set screw 109 may be threadably run inwardly within its threaded opening so as to securely clamp the end of the saw blade relative to blade holder 105. Further, another set of arms, as indicated at 118a, 118b, is provided at right angles relative to arms 117a, 117b, with these alternate arms also having recesses in their top and bottom faces for being pivotally supported on shoulders 113a, 113b of cap 101. It will be understood with the blade holder mounted within opening 111 of cap 101 90 degrees from the position shown in FIG. 8, the cutting teeth of blade 99 will be positioned at right angles relative to the normal position of the cutting blade thereby to enable the saw 1 of the present invention to make transverse (lateral) or rip cuts.

In order to accommodate pin end-type saw blades 99 (not shown) having outwardly projecting mounting pins, blade holder 105 has an exposed face 121 opposite the end thereof incorporating set screw 109. A transverse groove 122 is provided in face 121 such that a pin end blade may be inserted in the top end (as shown in FIG. 6) of blade holder 105 with its pins disposed in groove 122 and the blade holder may be inserted in opening 111 of cap 101 in a manner similar as above-described.

As generally indicated at 123, a blade guard of impact-resistant, transparent plastic is pivotally mounted to the upper frame arm 9a of saw frame 5 so as to at least partially enclose saw blade 99 and to help protect the user of the saw blade from injury. Also, guard 123 acts to hold the workpiece on table T. Guard 123 is pivotally movable in vertical direction about clamping knobs 124 thereby to permit work of various thicknesses to be readily moved into position on table T underneath the bottom face of the guard. As shown in FIG. 4, guard 123 is provided with a blade slot 125 at its forward end so as to permit blade 99 to be inserted in and removed from the upper and lower beams 63 and 65.

Crank drive assembly 79 is shown to comprise a counterbalance wheel 127 fixedly secured to the inner end of motor shaft 19. The counterbalance wheel has a center opening 129 for receiving the motor shaft, and further has another aperture 131 positioned eccentrically with respect to center opening 129. A connecting rod 133 is secured to eccentric aperture 131 by means of a wrist bolt 135. The lower or outer end of connecting rod 133 is secured to the rear end of lower beam 65 by means of a connecting bolt 137 received in a bolt opening 139 in the lower beam 65. Connecting rod 133 is journalled on bolts 135 and 137 by suitable ball bearings 140, as shown in FIG. 5. A spacer 141 is interposed within the hollow lower beam surrounding the shank of bolt 137.

In accordance with this invention, as best shown in FIGS. 2, 10, and 11, a short stroke, one-piece bellows air pump, as indicated at 201, is driven by the up and down movement of the rear end of lower beam 65. As shown in FIG. 11, pump 201 is formed of a unitary molding of a suitable synthetic resin, such as polypropylene, having a bellows body 203 having an inlet/outlet nozzle 205. A piston wall 207 is hingedly connected to body 203 by a continuous hinge 209. Piston wall 207 has a sliding, sealing fit within piston body 203. An actuator arm 211 is connected to piston wall 207 by a hinge 213. Actuator arm 211 has a clip 215 on its outer end for positively engaging sleeve 141 such that arm 211 moves up and down through a relatively long stroke with sleeve 141. With pump body 203 stationarily mounted relative to lower beam 65, the up and down motor of arm 211 causes piston wall 207 to reciprocate within pump body 203. As the piston wall is moved inwardly, air within the piston body is compressed and forced out of nozzle 205. A flexible hose 217 (see FIG. 2) is connected to nozzle 205 and the hose leads guard 123 so as to blow air onto the workpiece (not shown) proximate the location of the cut so as to blow sawdust or other debris from the area of the cut. As piston wall 207 is moved away from nozzle 205, air is drawn into the outer end of hose 217. It will be understood that with the pump 201 operated at high speed (e.g., 1725 cycles per minute), a steady stream of low pressure air is emitted from the end of hose 217.

As shown best in FIG. 7, work table T is provided with a pair of receptacles 149 spaced apart a predetermined distance, and being shaped and sized so as to receive a pair of blade holders 105. With set screws 109 loosened, and with a plain end saw blade 99 to be fitted to the blade holders loosely inserted within blade receiving slots 115. The blade holders are positioned apart a predetermined distance. Set screws 109 can be readily tightened by means of an allen wrench, shown in FIG. 7. Then, with insert 61 removed from opening 59 in table surface 55, the lower blade holder may be readily inserted into opening 111 of cap 101 carried by the lower beam 65, and the other blade holder 105 may be readily inserted within the opening 111 of the cap 101 carried by the upper beam, with the fulcrum recesses 119a, 119b of arms 117a, 117b of each of the blade holders being in pivotal engagement with their respective fulcrum shoulders 113a, 113b of both caps 101. Threaded knob 91 may thus be tightened so as to draw the inner ends of the beams toward one another, and thus to place a tension load on blade assembly 75. Retainers 103 aid in holding blade holders 105 in opening 111 in cap 101.

If pin end blades (not shown) are used, the blade holders are inserted in openings 111 of caps 101 in an inverted position from that shown in FIGS. 4 and 8, and are held in position by removable keys 156 while the blade and the pins are inserted in grooves 122 of the blade holders. Knob 91 is tightened so as to tension blade 99 and keys 156 are then removed.

Additionally, elongate slots 153 are provided in work table T for receiving a conventional miter gauge 155 thereby to serve as a guide for moving work past blade 99, and to ensure that uniform, straight cuts are achieved.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

We claim:

1. A walking beam scroll saw having a base, a frame carried by said base, said frame having a generally vertically extending rear portion, a top frame portion cantilevered forwardly from said rear portion, and a bottom frame portion cantilevered forwardly from said rear portion with said top and bottom frame portions being spaced apart vertically from one another, an induction electric motor secured directly to said rear frame portion, said motor having a drive shaft extending inwardly of said frame, an upper beam pivotally mounted with respect to said upper frame portion intermediate the ends of said upper beam, a lower beam pivotally mounted with respect to said bottom frame portion intermediate the ends of said lower beam, a blade extending between the outer ends of said upper and lower beams, means interposed between said upper and lower beams adjacent the other ends thereof for placing said blade under tension, eccentric linkage means interconnecting said motor shaft and one of said beams at the portion of said one beam proximate said tension means for reciprocably, pivotally moving said one beam up and down with respect to said frame and, via said blade and said tensioning means, effecting up and down movement of said other beam, each of said beams being of hollow, circular, tubular construction so as to minimize the mass of said beams and to minimize vibrations, and yet so as to maximize the stiffness of the beams in both vertical and lateral direction, said saw further comprising means for positively holding said blade on the outer end of each of said beams, said blade holding means comprising a one-piece member having a slot therein for receiving one end of said blade, means for securing said blade with respect to said blade holding member, the latter having a pair of supports on opposite sides thereof, said supports being pivotally, rockably supported in a portion of said beam for rocking in a substantially fore and aft direction as said beams are reciprocated upwardly and downwardly.

2. A walking beam scroll saw as set forth in claim 1 wherein each of said beams has a cap fitted into the outer open end thereof, said cap having a pivot shoulder engageable with said supports on said blade holding member for rockably supporting said blade holding member with said saw blade under tension.

3. A walking beam scroll saw as set forth in claim 1 further comprising a blade guard pivotally supported with respect to said top frame portion and extending forwardly for surrounding, at least in part, said blade, said guard being substantially stationary with respect to said reciprocably driven top and bottom beams.

4. A walking beam scroll saw as set forth in claim 1 wherein said base includes a table for supporting the work to be cut, said table having a pair of spaced recesses therein for receiving and locating a pair of said blade holding members, with said blade holding members being spaced apart from one another a predetermined distance, said blade holding members each having a slot therein for receiving a portion of a plain end saw blade, and means for securing said blade holding members with respect to said plain end saw blade at a desired spacing so as to facilitate placement of said blade holding means and said plain end blade in said beams.

5. A walking beam scroll saw as set forth in claim 4 wherein said blade holder further comprises a blade clip of resilient material, said clip being insertable into said blade receiving slot of said blade holder, said blade clip biasing said saw blade inserted into said slot in one direction thereby to accommodate saw blades of varying widths.

6. A walking beam scroll saw as set forth in claim 1 wherein each of said blade holding means has a slot and an intersection groove therein for receiving and holding a pin end blade.

7. A walking beam scroll saw as set forth in claim 3 further including an air pump driven by up and down movement of one of said beams, said air pump having a discharge port, said discharge port having a flexible tube connected thereto, said flexible tube extending forwardly through said upper frame portion and along said guard for exhausting air proximate said saw blade thereby to blow sawdust and other debris from the work in the area of the cut.

8. A walking beam scroll saw as set forth in claim 7 wherein said pump comprises a pump body, said discharge port being in communication with said pump body, a piston wall hingedly connected to said pump body and movable relative thereto between an inward position in which said piston wall is spaced adjacent said outlet port, and an outward position in which said piston wall is distal from said discharge port such that air is alternately drawn into and forced out of said pump body as said piston wall reciprocates therein.

9. A walking beam scroll saw as set forth in claim 8 wherein said piston wall has a drive area connected thereto, said drive arm being reciprocably driven by said lower beam.

* * * * *